United States Patent
Preisner et al.

(10) Patent No.: US 7,080,569 B2
(45) Date of Patent: Jul. 25, 2006

(54) POWERSHIFT TRANSMISSION HAVING TWO CLUTCHES AND A DEVICE FOR RECORDING THE CLUTCH TORQUE AND METHOD FOR THE CONTROL OF A PUSH DOWNSHIFT

(75) Inventors: Marian Preisner, Bühl (DE); Jürgen Benz, Oberkirch (DE); Reinhard Berger, Bühl (DE); Dietmar Lang, Höheischweiler (DE); Alexander Schweizer, Walzbachtal-Jöhlingen (DE); Olaf Werner, Bühl (DE)

(73) Assignee: Luk Lamellen und Kupplungsbau Beteiligungs KG, Buhl (DE)

( * ) Notice: Subject to any disclaimer, the term of this patent is extended or adjusted under 35 U.S.C. 154(b) by 129 days.

(21) Appl. No.: 10/709,670

(22) Filed: May 21, 2004

(65) Prior Publication Data

US 2004/0255707 A1    Dec. 23, 2004

(30) Foreign Application Priority Data

May 23, 2003    (DE) ................................ 103 23 312

(51) Int. Cl.
*F16H 59/00*    (2006.01)
(52) U.S. Cl. ........................................................ 74/337
(58) Field of Classification Search ................ 475/125, 475/126; 74/337; 192/48.9, 54.1, 3.58; 477/149

See application file for complete search history.

(56) References Cited

U.S. PATENT DOCUMENTS

| | | | |
|---|---|---|---|
| 5,304,102 A * | 4/1994 | Narita et al. ................. | 475/125 |
| 6,514,166 B1 * | 2/2003 | Yuasa et al. ................. | 475/125 |
| 6,740,005 B1 * | 5/2004 | Watanabe et al. ........... | 477/110 |

* cited by examiner

*Primary Examiner*—Dirk Wright
(74) *Attorney, Agent, or Firm*—Simpson & Simpson, PLLC

(57) ABSTRACT

A powershift transmission is proposed using two transmission paths, a friction clutch being assigned to each transmission path and the transmission paths being coupleable to an output shaft for torque transmission. The transmission has a device that detects the clutch torque transmitted by the friction clutch of the active transmission path, which is coupled to the output shaft, and, when the clutch torque falls below threshold value, initiates a disengagement of the active gear ratio.

11 Claims, 2 Drawing Sheets

POWERSHIFT TRANSMISSION HAVING TWO CLUTCHES AND A DEVICE FOR RECORDING THE CLUTCH TORQUE AND METHOD FOR THE CONTROL OF A PUSH DOWNSHIFT

CROSS REFERENCE TO RELATED APPLICATION

This patent claims priority of German Patent Application No. 103 23 312.1, filed May 23, 2003, which application is incorporated herein by reference.

BACKGROUND OF THE INVENTION

The present invention relates to a power shift transmission having two transmission paths, a separate friction clutch being assigned to each transmission path and the transmission paths being coupleable to an output shaft for torque transmission. The invention also relates to a method for the control of a push downshift of a power-shift transmission having two transmission paths.

The aforementioned powershift transmission is a transmission provided for use in a motor vehicle and having two transmission paths. The actuation of the individual transmission paths during the shifting process and the actuation of the friction clutches may be accomplished via electromechanical and/or hydraulic actuators. Cited as a special embodiment of such a dual clutch transmission is a so-called parallel shift gearbox (PSG) in which the individual gears are disposed in two transmission elements, the two aforementioned transmission paths, each transmission path having its own friction clutch for torque engagement.

A parallel shift gearbox of this type is powershiftable to prevent an interruption of tractive force during the shifting operation; that is, with it, it is possible to pre-select a gear in the transmission element without a load while the torque is being transmitted by the other transmission element. If the actual shifting operation, that is the cross-fading from one gear to the next, is to occur, the torque is cross-faded from the friction clutch assigned to the active transmission path to the friction clutch assigned to the inactive transmission path.

A great advantage of such a parallel shift gearbox compared to the use of an automatic transmission having a planetary gear is the reduction in fuel consumption of the engine coupled thereto, because an automatic transmission regularly has multiple clutches or brake bands, that produce friction and, thus, a loss of power.

However, in a parallel shift gearbox, the clutch, also configurable as a friction clutch, of the transmission element that is torque-free at that moment produces no slip as long as also no gear is pre-selected in the transmission element.

The requirement profile for such a parallel shift gearbox corresponds to a large extent to that for an automatic transmission; this means that a vehicle equipped with such a parallel shift gearbox is supposed to provide a driving comfort that corresponds to that of a vehicle equipped with a planetary gear.

As already mentioned below, the parallel shift gearbox is powershiftable, which is valid for shifts in pull mode as well as shifts in push mode of the vehicle equipped with it.

An essential criterion regarding a motor vehicle equipped with such a transmission is the prevention, generally speaking, of vibration problems. If then a vehicle is considered in terms of vibration technology in the area of the drive, then vibrations occurring in the area of the engine/transmission/drivetrain chain may contribute to a reduction of the driving comfort experienced by the driver. Therefore, a driver would surely consider judder movements during a gear change operation to be detrimental to driving comfort and similarly would also judge vibrations occurring in the drivetrain to be negative with regard to driving comfort.

Dynamic vibration operations may occur for a parallel shift gearbox during the gear change, for example, also during downshifting operations from, for example, second into first gear during the push mode, thus, for example, when the vehicle is coasting up to a red light.

In tests carried out on the vehicle, it is shown then that such drivetrain vibrations, which are to be avoided, may occur during push downshifts as a consequence of a synchronization jolt.

OBJECTS OF THE INVENTION

Starting from this point, the object of the present invention is to further develop a powershift transmission of the species having two transmission paths in such a manner that the excitation of drivetrain vibrations during push downshifts may be avoided. Moreover, a method for control of a push downshift of a powershift transmission having two transmission paths is to be provided.

To achieve this objective, regarding the powershift transmission, the invention has the features specified in claim 1. Advantageous embodiments of it are described in the additional claims.

Moreover, to achieve this objective, regarding the method, the invention has the features specified in claim 6.

BRIEF SUMMARY OF THE INVENTION

The invention creates then a powershift transmission having two transmission paths, a friction clutch being assigned to each transmission path and the transmission paths being coupleable, alternately, to a drive shaft for torque transmission into and from the drivetrain of a vehicle provided therewith, the transmission having a device that detects the clutch torque transmitted by the friction clutch of the active transmission path coupled to the output shaft, and a disengagement of the active gear ratio being initiated if the clutch torque falls below a threshold value.

This means, in other words, that the powershift transmission provided according to the invention in the form of, for example, a parallel shift gearbox has a device that is capable of detecting the clutch torque transmitted by the active clutch and is able to set in motion a disengagement of the active gear ratio if the detected clutch torque is below, for example, an empirically determined vehicle-specific threshold clutch torque value.

If the device provided according to the invention determines that the clutch torque falls below a value of, in particular, about 15 Nm, then it is able to output to a transmission control a signal to disengage the engaged gear ratio of the active transmission path into the neutral position. In this way it is achieved that the drivetrain is released before it ends up exciting drivetrain vibrations, which could be excited by a synchronization jolt during the insertion of a new, especially lower gear ratio on the heretofore-inactive transmission path.

Because it has been shown that the drivetrain vibrations considered here could be excited especially during push downshifts, it is provided according to the invention that the device is functionally joined to the transmission control for the reception of the signals that signal a push downshift and the device may be activated by such signals for the detection of the clutch torque. In other words, this means that it is not necessary to continually monitor the clutch torque by means of the device provided according to the invention, but instead the device is only activated for determination of the clutch torque if a push downshift is triggered by the transmission control and, along with this, the clutch torque of the active clutch is monitored by the device.

Between the transmission control and the device, a feedback may take place in such a manner that the device outputs a signal to the transmission control that the active gear ratio is to be disengaged as soon as the detected clutch torque of the active clutch falls below the threshold value described above of, for example, 15 Nm.

According to a further development of the invention, the device may also be configured for detection of vibrations in the drivetrain of a vehicle provided with the powershift transmission. According to this further development of the invention, the device may also permit a lower threshold value than the threshold value described above of, for example, 15 Nm in relation to the clutch torque transmitted by the active clutch before the signal to disengage the active gear ratio is made to the transmission control as long as still no comfort-diminishing vibrations in the drivetrain of the vehicle are detected by the device.

According to a further development of the invention, the device is also configured for the vehicle-specific detection of the clutch torque threshold value beneath which drivetrain vibrations occur. Thus, an adaptive behavior of the device provided according to the invention is possible in such a manner that the threshold value may be adapted as a function of the particular driving situation of the vehicle, and, thus, a situation-specific threshold value may be set.

As was already mentioned above, vehicle driving tests have shown that, because of synchronization jolts during push downshifts when the vehicle is coasting and downshifts from second gear to first gear, drivetrain vibrations that diminish driving comfort may occur.

As a remedial measure for this phenomenon, the invention also provides a method for control of a push down-shift of a powershift transmission with multiple steps having two transmission paths.

In a first step, it is determined according to the method of the invention that a lower gear ratio is engaged in the inactive transmission path than is presently engaged in the active transmission path, thus, for example, a downshift from second to first gear occurs.

In a next step, the clutch torque of the clutch assigned to the active transmission path is calculated, which may be accomplished, for example, using the device presented above.

Thereupon, it is detected whether—because, for example, the transmission control in the meantime has given a command for disengagement of the active gear ratio to the electromechanical or hydraulic actuator (gear actuator)—the transmission path active at the beginning of the method sequence is already in the neutral position.

In a next step, as a function of the detection of the clutch torque of the clutch that is assigned to the active transmission path and as a function of the transmission position of the active or formerly active transmission path, a signal is output to the transmission control to drive the transmission path into the neutral position.

Finally, in a further step and as a function of the detection of the transmission position, a signal is output to the transmission control to engage the lower gear ratio on the previously inactive transmission path.

BRIEF DESCRIPTION OF THE DRAWINGS

The invention is explained in detail below with reference to the drawing. In the drawing.

DETAILED DESCRIPTION OF THE PREFERRED EMBODIMENT

Figure 1:
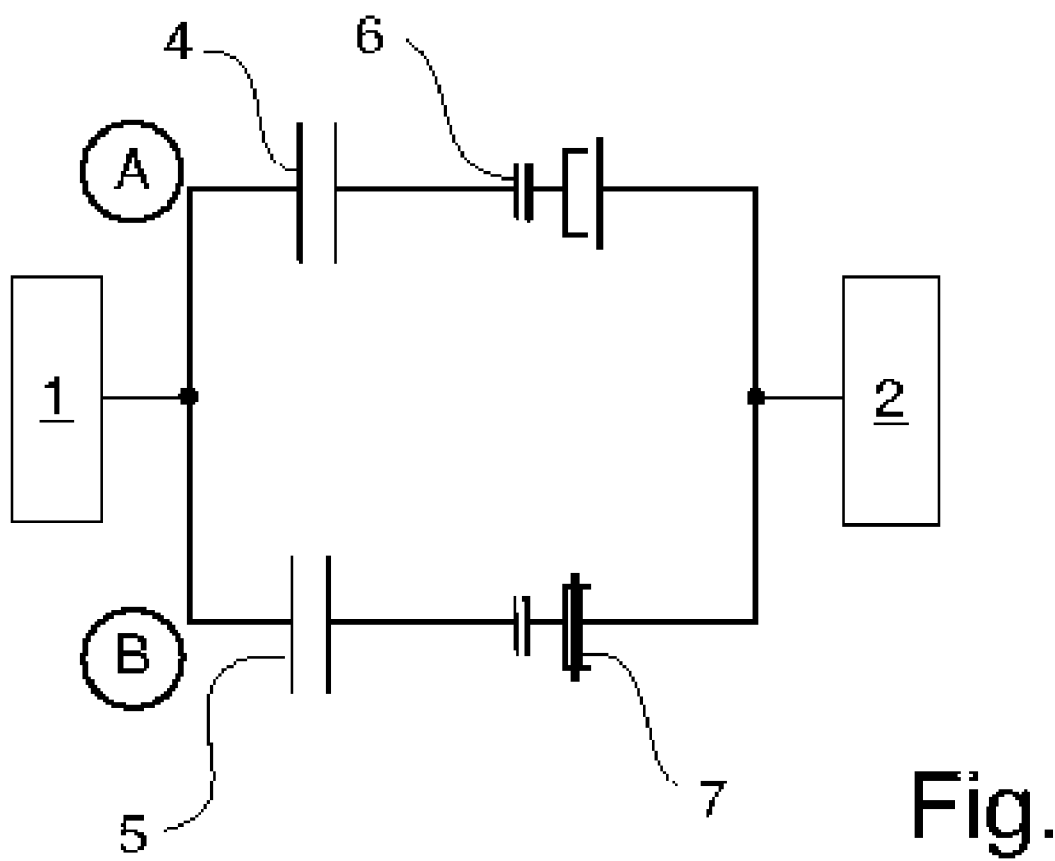
FIG. 1 shows diagrammatically and in simplified representation a model of a parallel shift gearbox/drivetrain.

As already mentioned, FIG. 1 of the drawing shows a diagrammatic illustration of a drivetrain having a parallel shift gearbox.

An engine 1 provides the engine torque required to drive vehicle 2 and engages it in a parallel shift gearbox that is diagrammatically designated using the reference character 3.

The parallel shift gearbox has two transmission paths that are designated as A and B in FIG. 1 of the drawing.

The two transmission paths A and B each have their own friction clutch 4, 5 for the engagement of the output torque (or the drag torque) originating from the engine in the particular transmission path.

In the position of parallel shift gearbox 3 that is represented in FIG. 1 of the drawing, transmission path B is in the active position and transmission path A is in the inactive position.

If at this point a push downshift operation, for example from second to first gear, is to be initiated and thus a cross-fading of the clutch torque from clutch 5 to clutch 4 is to occur, then a gear ratio is to be pre-selected on inactive clutch path A and for this purpose an engagement operation is implemented via schematically represented synchronization 6 on transmission path A.

It has been shown that this synchronization may lead to undesired drivetrain vibrations if the clutch torque transmitted by clutch 5 accepts very small values of, for example, less than 15 Nm; thus, the clutch still transmits only very little torque or is already open and the gear ratio having reference character 7 disposed on active transmission path B is still engaged.

To eliminate this problem, the powershift transmission of the invention now has a device that is able to detect the clutch torque transmitted by friction clutch 5 and, when the clutch torque falls below a threshold of, for example, 15 Nm or less, which may be determined empirically and for specific vehicles, initiates a disengagement of active gear ratio 7.

Figure 2:
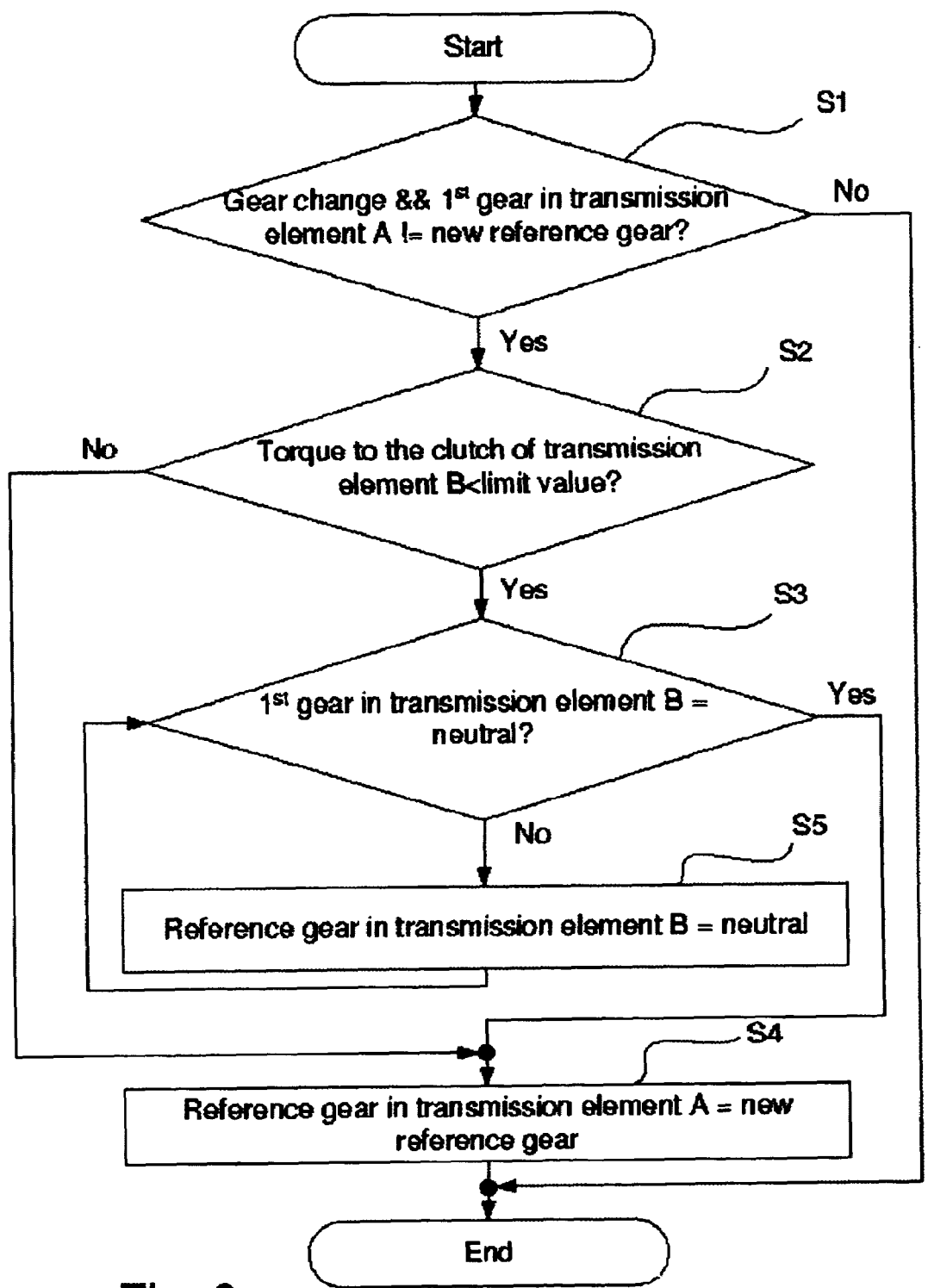
FIG. 2 shows a flow chart for explanation of the method of the present invention.

The individual steps of this case are explained below in reference to FIG. 2 of the drawing.

First, a determination is made in a first methodological step S1 as to whether a gear ratio is to be engaged in the inactive transmission path A, that is, a gear change is to be carried out. It is assumed in the illustration to follow here that this gear change operation is a push downshift, parallel shift gearbox 3 according to FIG. 1 is, for example, in second gear (transmission element or transmission path B active), a push downshift into first gear is to occur (transmission element or transmission path A active), and in conjunction with this a cross-fading of the clutch torque from clutch 5 to clutch 4.

If the check made in step S1 revealed that such a gear change is to occur, a check is made in step S2 of whether the clutch torque transmitted by clutch 5 of transmission element B is less than a limit value of, for example, 15 Nm.

If this check has revealed that clutch 5 is already open or is in the slipping state and henceforth transmits very little clutch torque, then, in a next step S3, a check is made of whether gear ratio 7 is still engaged or transmission element B has already been driven into the neutral position. If it is detected during this check that gear ratio 7 is already released, then in a step S4 the new target gear or reference gear may be engaged in transmission element A. In a similar way, the procedure may also jump directly from step S2 to step S4 and an instruction is immediately issued to the transmission control to engage the new target gear (in the illustrated exemplary embodiment, first gear) if the torque transmitted by clutch 5 is still greater than the clutch torque threshold value.

However, if the check in step S3 has revealed that transmission element B is not yet in the neutral position and (see step S2) clutch 5 by this point only transmits less torque than the threshold value, then in a next step S5 an instruction is issued to the transmission control to drive transmission element B into the neutral position, thus, to disengage gear ratio 7.

A check carried out in step S3 in a further processing run serves to detect whether transmission element B is henceforth located in the neutral position, whereupon the procedure branches from step S3 to step S4 and in transmission element A the new target gear ratio, first gear, is engaged and thus is pre-selected.

The powershift transmission provided according to the invention may determine by means of its monitoring of the clutch torque of the clutch assigned to the active transmission path whether this clutch torque falls below a low threshold of, for example, 15 Nm, which favors the excitation of drivetrain vibrations. If this condition is fulfilled, then a signal is output from this device to the transmission control to disengage the still-active gear ratio, and, thus, the mass of the active transmission path is reduced and the tendency to excite drivetrain vibrations is reduced.

Regarding features of the invention that are not explained above in detail, refer expressly to the claims and the drawings.

The invention claimed is:

1. A powershift transmission comprising two transmission paths, a friction clutch assigned to each transmission path, said transmission paths being coupleable to an output shaft for torque transmission, and a device that detects the clutch torque transmitted by the friction clutch of the active transmission path coupled to the output shaft and when the clutch torque falls below a threshold value initiates a disengagement of an active gear ratio.

2. The powershift transmission as described in claim 1, wherein the device is functionally coupled to a transmission control for the reception of signals that signal a push downshift and the device may be activated via the signals for detection of the clutch torque.

3. The powershift transmission as described in claim 1, wherein the device is configured to output to a transmission control a signal to disengage the active gear ratio.

4. The powershift transmission as described in claim 2, wherein the device is configured to output to a transmission control a signal to disengage the active gear ratio.

5. The powershift transmission as described in claim 1, wherein the device is configured for the detection of vibrations in the drivetrain of a vehicle that is provided with the powershift transmission.

6. The powershift transmission as described in claim 2, wherein the device is configured for the detection of vibrations in the drivetrain of a vehicle that is provided with the powershift transmission.

7. The powershift transmission as described in claim 3, wherein the device is configured for the detection of vibrations in the drivetrain of a vehicle that is provided with the powershift transmission.

8. The powershift transmission as described in claim 5, wherein the device is configured for vehicle-specific determination of the clutch torque threshold value below which drivetrain vibrations occur.

9. The powershift transmission as described in claim 6, wherein the device is configured for vehicle-specific determination of the clutch torque threshold value below which drivetrain vibrations occur.

10. The powershift transmission as described in claim 7, wherein the device is configured for vehicle-specific determination of the clutch torque threshold value below which drivetrain vibrations occur.

11. A method for controlling a push downshift of a powershift transmission having first and second transmission paths, wherein the first transmission path is an inactive transmission path and the second transmission is an active transmission path, which method comprises the steps of:
   a) determining in the first transmission path whether a lower gear ratio is to be engaged than the gear ratio that is engaged in the second transmission path;
   b) calculating the transmitted torque of the clutch assigned to said second transmission path;
   c) determining whether said second transmission path is in a neutral position;
   d) as a function of step b) and step c) generating an output signal to a transmission control to shift the second transmission path into a neutral position, and
   e) as a function of step c) generating an output signal to the transmission control to shift to a lower gear ratio in the first transmission path.

* * * * *